US011523567B1

(12) United States Patent
Davis

(10) Patent No.: US 11,523,567 B1
(45) Date of Patent: Dec. 13, 2022

(54) ROSE BUSH COVER ASSEMBLY

(71) Applicant: Shone Davis, Zion, IL (US)

(72) Inventor: Shone Davis, Zion, IL (US)

(*) Notice: Subject to any disclaimer, the term of this patent is extended or adjusted under 35 U.S.C. 154(b) by 0 days.

(21) Appl. No.: 17/348,440

(22) Filed: Jun. 15, 2021

(51) Int. Cl.
*A01G 13/04* (2006.01)

(52) U.S. Cl.
CPC .................... *A01G 13/04* (2013.01)

(58) Field of Classification Search
CPC ............... A01G 13/04; A01G 13/0281; A01G 13/0243; A01G 13/043; A01G 13/0237; A01G 13/10
USPC ...................................... 47/31, 31.1
See application file for complete search history.

(56) References Cited

U.S. PATENT DOCUMENTS

| 1,996,525 | A | * | 4/1935 | Sage ...................... | A01G 13/04 47/32.2 |
| 2,014,175 | A | * | 9/1935 | Hart ...................... | A01G 13/043 47/20.1 |
| 2,063,822 | A | * | 12/1936 | Muller .................... | A01G 13/04 47/32.2 |
| 2,141,484 | A | * | 12/1938 | Piglia ..................... | A01G 13/04 47/72 |
| 2,181,016 | A | * | 11/1939 | Gross ..................... | A01G 13/04 47/29.1 |
| 2,226,812 | A | * | 12/1940 | Goldberg ............... | A01G 13/04 47/29.1 |
| 3,803,759 | A | * | 4/1974 | Heinecke ............... | A01G 13/04 47/29.2 |
| 4,646,467 | A | | 3/1987 | Morrisroe | |
| 4,829,707 | A | | 5/1989 | Koffler | |
| 5,423,148 | A | * | 6/1995 | Thornhill ................ | A01G 9/12 47/29.1 |
| 5,426,887 | A | * | 6/1995 | Spencer ................. | A01G 13/04 47/29.5 |
| 5,540,014 | A | | 7/1996 | Smith | |
| 5,813,170 | A | * | 9/1998 | Friesner ................. | A01G 13/04 47/30 |
| 5,850,709 | A | * | 12/1998 | Mahoney ............... | A01G 13/04 47/72 |
| 6,311,427 | B1 | * | 11/2001 | McNally ................. | A01G 13/04 47/29.3 |
| 8,156,975 | B1 | | 4/2012 | Pickering | |
| 8,464,463 | B1 | * | 6/2013 | Fraser ..................... | A01G 13/10 47/31 |
| D751,355 | S | | 3/2016 | Vizachero | |
| 2002/0134010 | A1 | * | 9/2002 | Rohrborn, Jr. .......... | A01G 13/04 47/29.1 |
| 2005/0011114 | A1 | | 1/2005 | Craven | |

(Continued)

FOREIGN PATENT DOCUMENTS

WO    WO2017062749    4/2017

*Primary Examiner* — Yvonne R Abbott-Lewis

(57) ABSTRACT

A rose bush cover assembly for protecting a rose bush during inclement weather includes a wire frame that has a plurality of pointed ends and each of the pointed ends can be inserted into ground thereby anchoring the wire frame to the ground. Moreover, the wire frame has a cylindrical shape to surround a rose bush. A cone is molded over the wire frame to cover the rose bush when the wire frame is positioned around the rose bush. The cone is comprised of a thermally insulating material to protect the rose bush from cold temperatures. Additionally, the cone has a darkened color to absorb solar energy thereby warming the rose bush when the cone is positioned around the rose bush.

5 Claims, 6 Drawing Sheets

(56) References Cited

U.S. PATENT DOCUMENTS

2014/0196364 A1\* 7/2014 Mayner ................. A01G 13/04
                                                                              47/20.1
2017/0099786 A1    4/2017 Latten
2018/0160633 A1\* 6/2018 DeLao ............... A01G 13/0212

\* cited by examiner

ROSE BUSH COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rose bush devices and more particularly pertains to a new rose bush device for protecting a rose bush during inclement weather. The device includes a weighted wire frame and a cone that is molded over the wire frame. The weighted wire frame inhibits the cone from being displaced by wind or the like. In this way the cone can remain around the rose bush during inclement weather.

(2) Description of Related Art Including Information Disclosed Under 37 CFR 1.97 and 1.98

The prior art relates to rose bush devices including a bag that has unique structural features to facilitate the bag to be positioned around a rose bush. The prior art discloses a variety of modular covers that are positionable over a bush for protecting the bush from inclement weather. The prior art discloses a panel that can be formed into a cylinder for surrounding a plant to protect the plant from wind. The prior art discloses a cone that can be positioned over a rose bush and which includes light emitters. In no instance does the prior art disclose a weighted wire frame that is positionable around a rose bush and a cone that is slidable over the wire frame to protect the rose bush from inclement weather.

BRIEF SUMMARY OF THE INVENTION

An embodiment of the disclosure meets the needs presented above by generally comprising a wire frame that has a plurality of pointed ends and each of the pointed ends can be inserted into ground thereby anchoring the wire frame to the ground. Moreover, the wire frame has a cylindrical shape to surround a rose bush. A cone is molded over the wire frame to cover the rose bush when the wire frame is positioned around the rose bush. The cone is comprised of a thermally insulating material to protect the rose bush from cold temperatures. Additionally, the cone has a darkened color to absorb solar energy thereby warming the rose bush when the cone is positioned around the rose bush.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
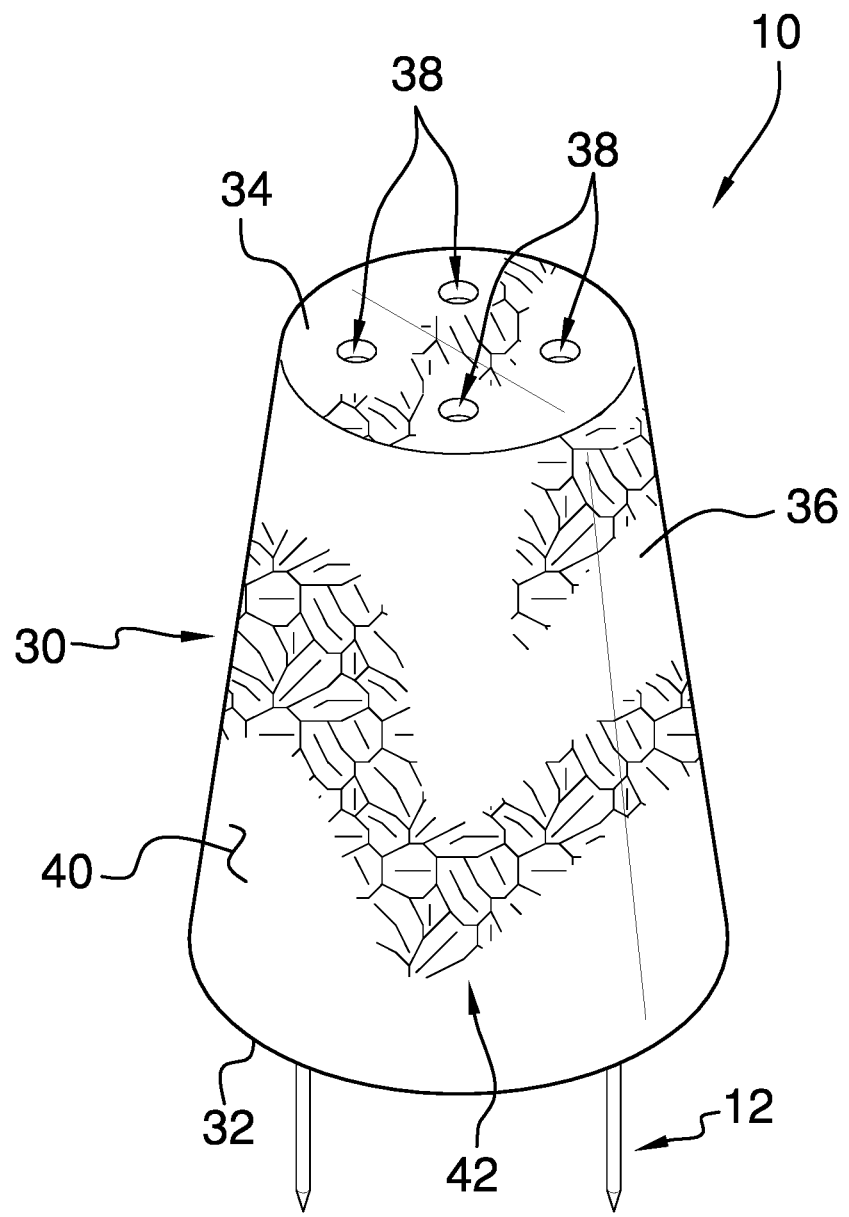
FIG. 1 is a perspective view of a rose bush cover assembly according to an embodiment of the disclosure.
Figure 2:
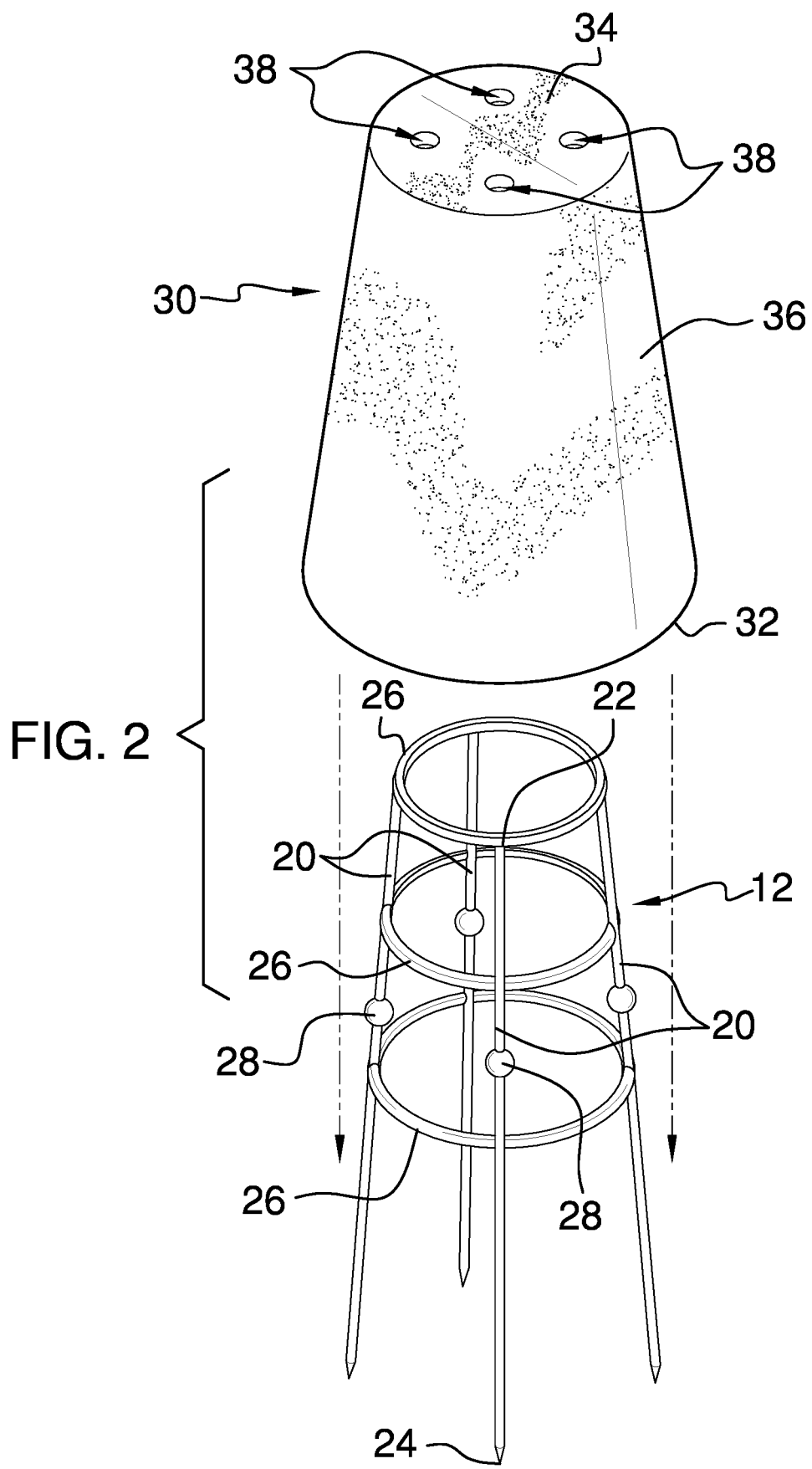
FIG. 2 is an exploded perspective view of an embodiment of the disclosure.
Figure 3:
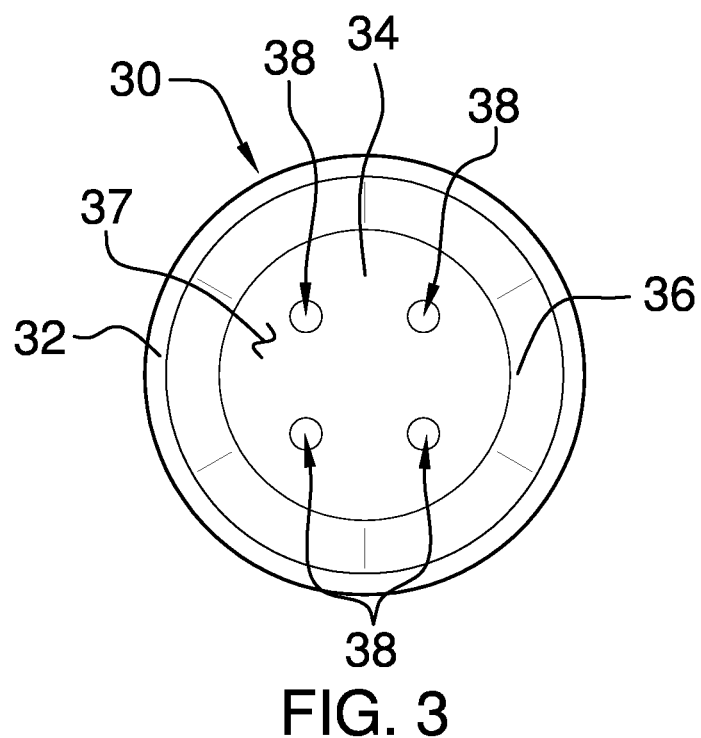
FIG. 3 is a bottom view of a cone of an embodiment of the disclosure.
Figure 4:
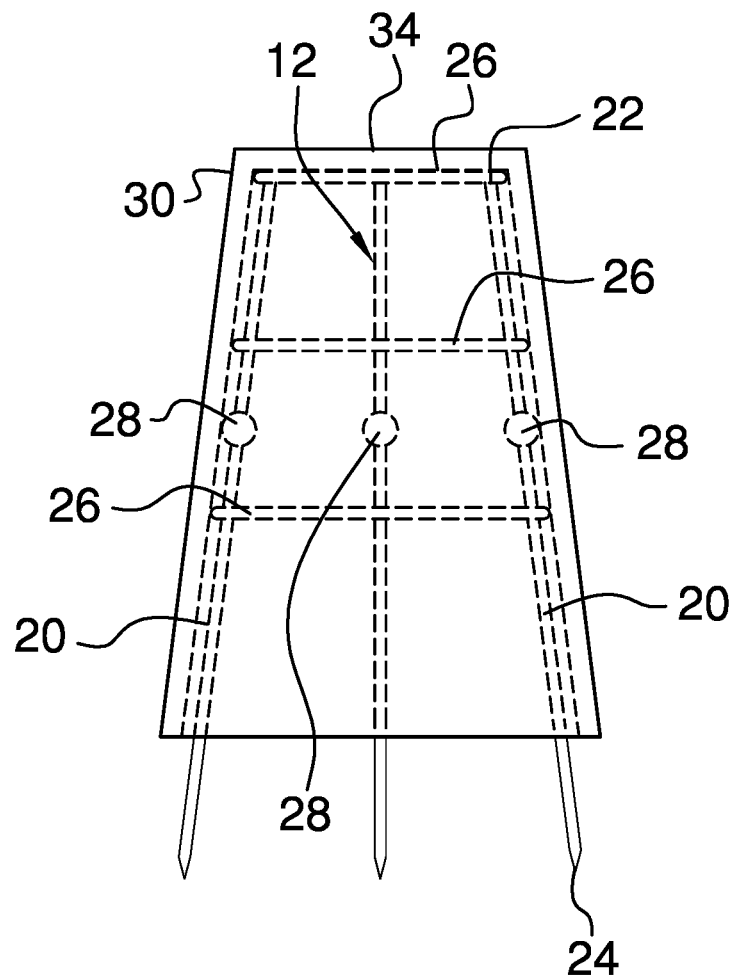
FIG. 4 is a front phantom view of an embodiment of the disclosure.

With reference now to the drawings, and in particular to FIGS. 1 through 6 thereof, a new rose bush device embodying the principles and concepts of an embodiment of the disclosure and generally designated by the reference numeral 10 will be described.

As best illustrated in FIGS. 1 through 6, the rose bush cover assembly 10 generally comprises a wire frame 12 that has a plurality of pointed ends 14. Each of the pointed ends 14 can be inserted into ground 16 thereby anchoring the wire frame 12 to the ground 16. In this way the wire frame 12 is inhibited from being displaced by wind or the like. The wire frame 12 has a cylindrical shape thereby facilitating the wire frame 12 to surround a rose bush 18 or other type of plant that grows in a similar manner to that of a bush. The wire frame 12 comprises a plurality of members 20 that each has a top end 22 and a bottom end 24. The bottom end 24 of each of the members 20 tapers to a point thereby facilitating the bottom end 24 of each of the members 20 to penetrate the ground 16.

The wire frame 12 includes a plurality of rings 26 and each of members 20 is coupled between each of the rings 26. The rings 26 are spaced apart from each other and are distributed from the top end 22 of the members 20 toward a point located proximate the bottom end 24 of the members 20. The members 20 are spaced apart from each other and are distributed around the rings 26. The plurality of rings 26 has a gradually increasing diameter between the bottom end 24 and the top end 22 of the members 20 such that the wire frame 12 has a conical shape.

The wire frame 12 includes a plurality of balls 28 that is each comprised of a weighted material, such as steel or the like. Each of the balls 28 is coupled to a respective one of the members 20 such that each of the balls 28 inhibits the members 20 from being displaced by wind or the like. Each of the balls 28 is positioned between the top end 22 and the bottom end 24 of the respective member. Additionally, each of the balls 28 may have a weight ranging between approximately 100.0 grams and 225.0 grams.

A cone 30 is provided and the cone 30 is molded over the wire frame 12 to cover the rose bush 18 when the wire frame 12 is positioned around the rose bush 18. The cone 30 is comprised of a thermally insulating material to protect the rose bush 18 from cold temperatures. Additionally, the cone 30 has a darkened color such that the cone 30 can absorb solar energy thereby warming the rose bush 18 when the cone 30 is positioned around the rose bush 18. The cone 30 has a lower end 32, an upper end 34 and an outer wall 36 extending between the lower end 32 and the upper end 34. Additionally, the outer wall 36 tapers inwardly between the lower end 32 and the upper end 34 such that the lower end 32 has a greater diameter than the upper end 34.

The lower end 32 is open thereby facilitating the lower end 32 to insertably receive the wire frame 12. The upper end 34 has a lower surface 37 and the lower surface 37 rests on the ring 26 that is coupled to the top end 22 of each of the members 20 of the wire frame 12. The upper end 34 has a plurality of air holes 38 each extending therethrough to pass air to the rose bush 18 when the cone 30 is positioned over the rose bush 18. The outer wall 36 has an outer surface 40 and the outer surface 40 has indicia 42 printed thereon. The indicia 42 may comprise floral images to enhance the ornamental appearance of the cone 30.

Figure 5:
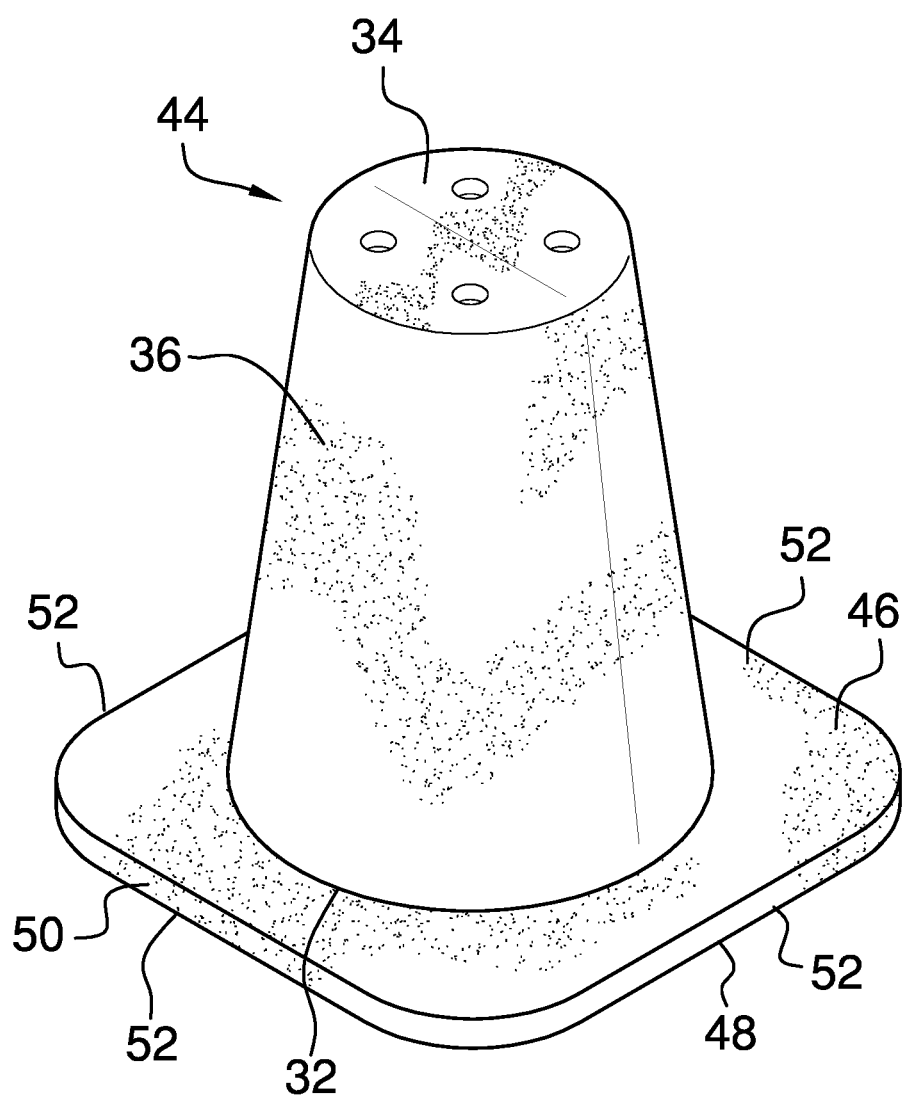
FIG. 5 is a perspective view of an alternative embodiment of the disclosure.
Figure 6:
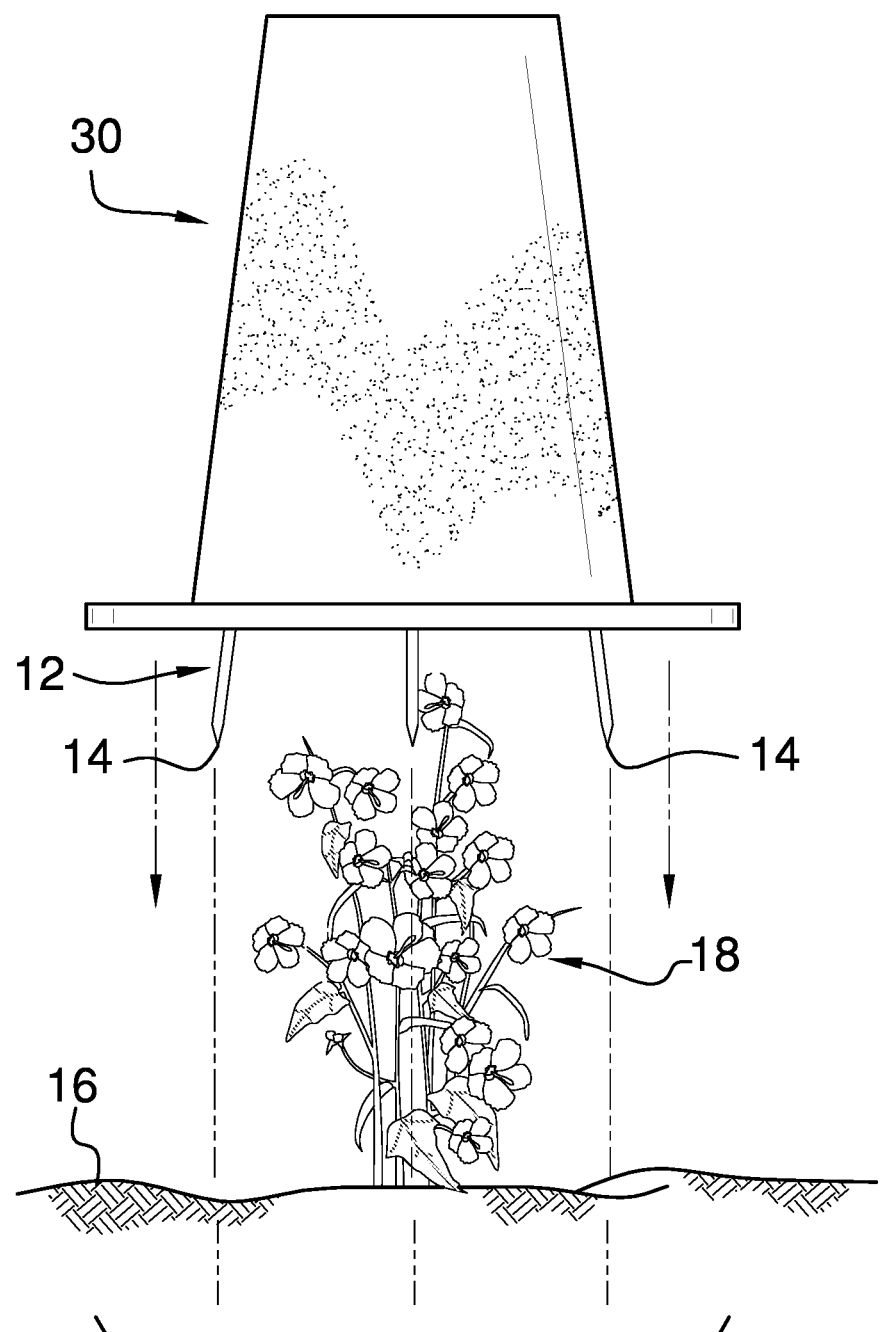
FIG. 6 is a perspective in-use view of an embodiment of the disclosure.

In an alternative embodiment 44 as is most clearly shown in FIGS. 5 and 6, the cone 30 includes a base 46 that is coupled to and extends 14 laterally away from the outer wall 36 of the cone 30. The base 46 has a bottom surface 48 and the bottom surface 48 is aligned with the lower end 32 of the cone 30. In this way the bottom surface 48 can rest on the ground 16 when the cone 30 is positioned around the rose bush 18. The base 48 has a distal edge 50 with respect to the outer wall 36 of the cone 30 and the distal edge 50 has a plurality of intersecting sides 52 such that the distal edge 50 of the base 46 defines a rectangle.

In use, the wire frame 12 is positioned around the rose bush 18 such that the bottom end 24 of the members 20 penetrates the ground 16. In this way the cone 30 covers the rose bush 18. Thus, the rose bush 18 is protected from wind, cold temperatures and other inclement weather that could potentially harm the rose bush 18.

The weight of the balls 28 inhibits the wire frame 12 from being displaced by wind thereby ensuring that the cone 30 remains around the rose bush 18 at all times. In this way the wire frame 12, the balls 28 and the cone 30 ensure the health of the rose bush 18 during inclement weather that could otherwise harm or kill the rose bush 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rose bush cover assembly for covering a rose bush during inclement weather, said assembly comprising:

a wire frame having a plurality of pointed ends wherein each of said pointed ends is configured to be inserted into ground thereby anchoring said wire frame to the ground, said wire frame having a cylindrical shape wherein said wire frame is configured to surround a rose bush; and a cone being molded over said wire frame wherein said cone is configured to cover the rose bush when said wire frame is positioned around the rose bush, said cone being comprised of a thermally insulating material wherein said cone is configured to protect the rose bush from cold temperatures, said cone having a darkened color Wherein said cone is configured to absorb solar energy thereby warming the rose bush when said cone is positioned around the rose bush, and wherein said wire frame comprises:

a plurality of members, each of said members having a top end and a bottom end, said bottom end of each of said members tapering to a point wherein said bottom end of each of said members is configured to penetrate the ground;

a plurality of rings, each of said members being coupled between each of said rings, said rings being spaced apart from each other and being distributed from said top end of said members toward a point located proximate said bottom end of said members, said members being spaced apart from each other and being distributed around said rings, said plurality of rings having a gradually decreasing diameter between said bottom end and said top end of said members such that said wire frame has a conical shape; and a plurality of balls, each of said balls being comprised of a weighted material, each of said balls being coupled to a respective one of said members wherein each of said balls is configured to inhibit said members from being displaced by wind, each of said balls being positioned between said top end and said bottom end of said respective member and spaced above a lowermost one of said rings.

2. The assembly according to claim 1, wherein said cone has a lower end, an upper end and an outer wall extending between said lower end and said upper end, said outer wall tapering inwardly between said lower end and said upper end such that said lower end has a greater diameter than said upper end, said lower end being open thereby facilitating said lower end to insertably receive said wire frame, said upper end having a lower surface, said lower surface resting on said ring being coupled to said top end of each of said members of said wire frame.

3. The assembly according to claim 2, wherein said upper end has a plurality of air holes each extending therethrough wherein said air holes are configured to pass air to the rose bush when said cone is positioned over the rose bush.

4. A rose bush cover assembly for covering a rose bush during inclement weather, said assembly comprising:

a wire frame having a plurality of pointed ends wherein each of said pointed ends is configured to be inserted into ground thereby anchoring said wire frame to the ground, said wire frame having a cylindrical shape wherein said wire frame is configured to surround a rose bush, said wire frame comprising:

a plurality of members, each of said members having a top end and a bottom end, said bottom end of each of said members tapering to a point wherein said bottom end of each of said members is configured to penetrate the ground;

a plurality of rings, each of said members being coupled between each of said rings, said rings being spaced apart from each other and being distributed from said top end of said members toward a point located proximate said bottom end of said members, said members being spaced apart from each other and being distributed around said rings, said plurality of rings having a gradually decreasing diameter between said bottom end and said top end of said members such that said wire frame has a conical shape; and a plurality of balls, each of said balls being comprised of a weighted material, each of said balls being coupled to a respective one of said members wherein each of said balls is configured to inhibit said members from being displaced by wind, each of said balls being positioned between said top end and said bottom end of said respective member and spaced above a lowermost one of said rings; and a cone being molded over said wire frame wherein said cone is configured to cover the rose bush when said wire frame is positioned around the rose bush, said cone being comprised of a thermally insulating material wherein said cone is configured to protect the rose bush from cold temperatures, said cone having a darkened color wherein said cone is configured to absorb solar energy thereby warming the rose bush when said cone is positioned around the rose bush, said cone having a lower end, an upper end and an outer wall extending between said lower end and said upper end, said outer wall tapering inwardly between said lower end and said upper end such that said lower end has a greater diameter than said upper end, said lower end being open thereby facilitating said lower end to insertably receive said wire frame, said upper end having a lower surface, said lower surface resting on said ring being coupled to said top end of each of said members of said wire frame, said upper end having a plurality of air holes each extending therethrough wherein said air holes are configured to pass air to the rose bush when said cone is positioned over the rose bush, said outer wall having an outer surface, said outer surface having indicia being printed thereon, said indicia comprising floral images wherein said indicia are configured to enhance the ornamental appearance of said cone.

5. The assembly according to claim 4, wherein said cone includes a base being coupled to and extending laterally away from said outer wall of said cone, said base having a bottom surface, said bottom surface being aligned with said lower end of said cone wherein said bottom surface is configured to rest on the ground when said cone is positioned around the rose bush, said base having a distal edge with respect to said outer wall of said cone, said distal edge having a plurality of intersecting sides such that said distal edge of said base defines a rectangle.

* * * * *